No. 836,487. PATENTED NOV. 20, 1906.
F. G. CRONE.
VALVE DRESSER.
APPLICATION FILED JAN. 29, 1906.
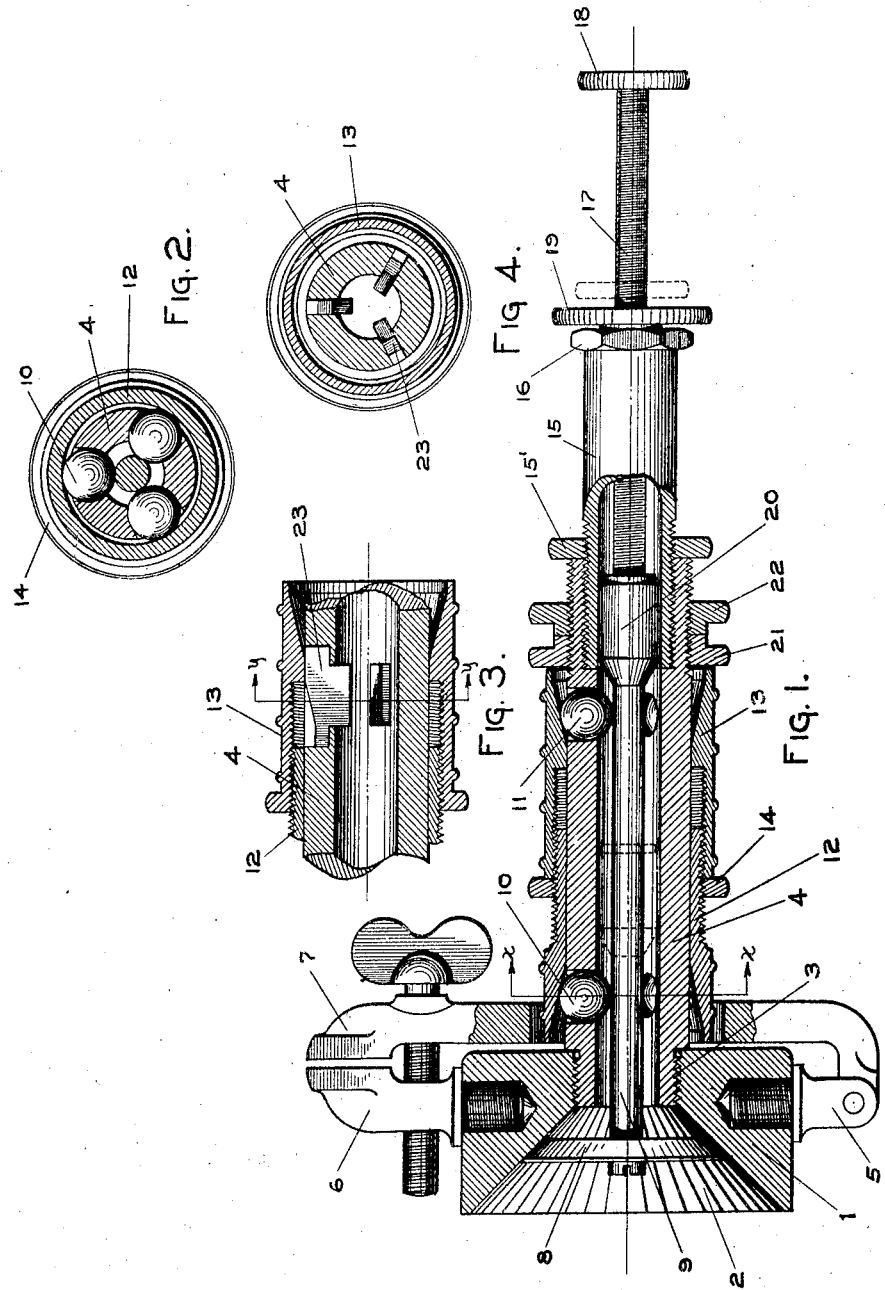
WITNESSES
W. E. Babbitt
E. A. Kelly
INVENTOR.
Francis G. Crone
By Macomber & Ellis
ATTORNEYS.

UNITED STATES PATENT OFFICE.

FRANCIS G. CRONE, OF BUFFALO, NEW YORK.

VALVE-DRESSER.

No. 836,487.　　　Specification of Letters Patent.　　　Patented Nov. 20, 1906.

Application filed January 29, 1906. Serial No. 298,492.

*To all whom it may concern:*

Be it known that I, FRANCIS G. CRONE, a citizen of the United States, residing at Buffalo, in the county of Erie and State of New York, have invented a new and useful Improvement in Valve-Dressers, of which the following is a specification.

My invention relates to valve-dressers, and more particularly to universal dressers which will dress valves of different sizes and which are seated on different angles, and I have so arranged my device that it is portable in form.

In the present large use of explosive-engines, especially in automobiles, there is special demand for a portable dresser sufficiently universal to meet the conditions of standard constructions. My invention is especially designed to meet this demand, although it has other large uses for valve-dressing.

I carry out my invention by the apparatus shown in the annexed drawings, in which—

Figure 1 is a longitudinal section of my valve-dresser with a valve in place for dressing, the inner position of the screw-stem being shown in dotted lines. Fig. 2 is a cross-section on the line $x$ $x$ of Fig. 1 looking to the right. Fig. 3 is a longitudinal detail showing a modified construction. Fig. 4 is a section on the line $y$ $y$ of Fig. 3.

I will first describe my valve-dresser. The dresser proper is shown at 1. This consists of a piece of hardened steel having fluted dressing-ribs 2 of the proper angle or degree for the seating-face of the valve. This steel piece is concentrically screw-threaded at 3 to receive the tube 4 and is bored and threaded on opposite sides to receive the lugs 5 and 6 of a clamp 7. By means of this clamp 7 the dresser may be attached to a fixed object to facilitate the operation of dressing. A valve and valve-stem are shown in place at 8 and 9, respectively. In cylindrical openings in the tube 4 are inserted steel balls 10 and 11 of equal diameter and symmetrically arranged radially. Taking over the tube 4 is a sleeve composed of the two members 12 and 13 and a set-nut 14. The sleeve 12 has a male thread and the sleeve 13 a female thread, and the sleeve 12 is threaded externally toward the set-nut 14. The internal ends of the sleeves 12 and 13 are bored cone-shaped to take over and press inwardly the balls 10 and 11. Threaded into the tube 4 is a tube 15, which is held by a lock-nut 15'. Secured to this tube 15 is a nut 16, into which takes a long threaded screw-stem 17, having a curved head 18 and which may be locked by a lock-nut 19. The inner end of this screw 17 engages against a cylindrical plug 20 and is capable of traveling back and forth in the tubes 4 and 15, which have an equal internal diameter. Threaded externally to the tube 4 is a nut 21 and a check-nut 22. The nut 21 is capable of bearing against the end of the sleeve 13. Having now indicated the several parts of this part of my invention, I will describe its operation.

Assume it is desired to dress the valve 8. The valve-stem 9 is inserted in the tube 4 and the seating-face brought into contact with the dressers 2. The sleeve 13 is then rotated on the sleeve 12 in the direction to extend these sleeves lengthwise. This brings the inner cone-shaped faces of the sleeves 12 and 13 against the balls 10 and 11 and forces them concentrically inwardly against the stem 9. This centers the stem 9 concentric with the sleeve 4, and sleeve 4 and dresser 1 being concentric the valve 8 is held concentrically. The nut 14 is then set up against the sleeve 13 to fix the adjustment. The stem 17 is next screwed in until the plug 20 strikes against the end of the valve-stem 9 and is then backed slightly to permit of the inward movement of the valve-stem 9 in dressing. The stem 17 is then fixed by the set-nut 19, and the clamp 7 having been attached to a fixed object the adjustment for dressing is complete. A screw-driver is inserted in the slot in the stem 9, and the stem 9 and the valve 8 are rotated against the dressers 2 until the valve is dressed. The stem 17 and the plug 20 prevent the dresser from hogging, and if the adjustment of the stem 17 is too close to permit of full dressing of the valve it may be slacked slightly and the dressing continued.

I will now explain the use of the nuts 21 and 22. Suppose a valve has a very short stem—so short that when the valve is in place the stem will not extend into engagement with the balls 11. In that case I insert the valve, as before, and screw the nut against the end of the sleeve 13 and force sleeves 13 and 12 forward until the hollow cone of sleeve 12 engages the balls 10 and forces them inwardly against the valve-stem. I then screw down the stem 17 and plug 20, as before, and thus hold the valve and stem with only one set of balls. I may thus use the device with a valve of any length of stem.

In Figs. 3 and 4 I have shown a modified form of construction, wherein I substitute for the balls 10 and 11 lugs 23. These lugs are much like the jaws of a chuck and fit into slots in the tube 4 in place of the balls. They have inclined outer surfaces to engage with the internal cones of the sleeves 12 and 13. While for general uses the balls are preferable, when short valve-stems are frequently encountered I prefer the lugs 23 in place of the balls 10, at least since they afford a line-bearing on the valve-stem instead of a point-bearing in the case of the ball and hold the stem more rigidly.

It will now be seen that by having a set of valve-dressers of the various standard pitches this tool becomes practically universal, since the different valve-dressers threaded to receive the tube 4 and the lugs 5 and 6 may be interchanged, and the dressers threaded to receive the sleeve 27 may be also interchanged, and thus almost all standard valves may be ground.

Manifestly in case a number of valves of standard size are to be dressed the tube 4 may be constructed with fixed pilots for concentrically centering the valve-stem 9 within the tube, and in such case the fixed pilots would take the place of the balls 10 and 11 and the overlapping screw-threaded cone-faced sleeves 12 and 13. In such event it is obvious that the same functions would be performed in the same way by such substitution of fixed parts as are performed by the movable parts shown in the drawings and heretofore described; but in such case if fixed parts are used they can be only used with valves having stems of one standard size.

Having thus described my invention, what I claim is—

1. A mechanism for dressing valves comprising a valve-dresser, a tube concentric therewith, balls symmetrically arranged in openings in said tube located at different points in its axis and sleeves screw-threaded to each other, taking over said tube and having internal cone-shaped faces capable of engaging said balls.

2. A mechanism for dressing valves comprising a valve-dresser, a tube concentric therewith, jaws symmetrically arranged in openings in said tube located at different points in its axis and sleeves screw-threaded to each other, taking over said tube and having internal cone-shaped faces capable of engaging said jaws.

3. A mechanism for dressing valves comprising a valve-dresser, a tube concentric therewith, balls symmetrically arranged in openings in said tube located at different points in its axis, sleeves taking over said tube screw-threaded to each other and having internal cone-shaped faces capable of engaging said balls and a screw-threaded stem and nut mediately secured to said tube and concentric therewith.

4. A mechanism for dressing valves comprising a valve-dresser, a tube concentric therewith, balls symmetrically arranged in openings in said tube, located at different points in its axis, sleeves taking over said tube screw-threaded to each other and having internal cone-shaped faces capable of engaging said balls and a clamp detachably secured to said dresser for securing said dresser to a fixed object.

5. A mechanism for dressing valves comprising a valve-dresser, a tube concentric therewith, balls symmetrically arranged in openings in said tube located at different points in its axis, sleeves taking over said tube screw-threaded to each other and having internal cone-shaped faces capable of engaging said balls and a nut and a check-nut externally threaded to said tube and capable of engaging the end of said sleeves to permit the same to bring one set of said balls into action when the valve-stem is too short to be engaged by both sets of said balls.

6. A mechanism for dressing valves comprising a valve-dresser, a tube concentric therewith, balls symmetrically arranged in openings in said tube located at different points in its axis, sleeves taking over said tube screw-threaded to each other and having internal cone-shaped faces capable of engaging said balls and a screw-threaded stem and nut mediately secured to said tube and concentric therewith, and a clamp for securing said dresser to a fixed object and detachably secured to said dresser.

7. A mechanism for dressing valves comprising a valve-dressing tool having a central perforation, a tube secured thereto concentric therewith which is adapted to receive the valve-stem and means connected with said tube for seating said valve-stem concentrically within said tube.

In testimony whereof I have hereunto set my hand in the presence of two witnesses.

FRANCIS G. CRONE.

Witnesses:
E. A. KELLY,
W. E. BABBITT.